Sept. 24, 1946.   B. V. ELLIOTT ET AL   2,408,255
HYDRAULIC INTERNAL LINE-UP CLAMP
Filed Sept. 13, 1944   2 Sheets—Sheet 2
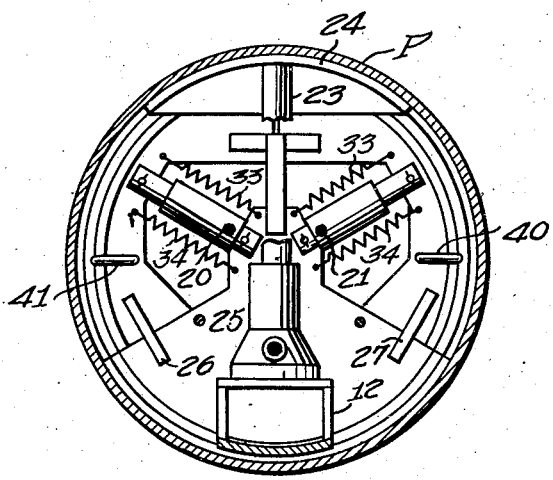
FIG.-3-
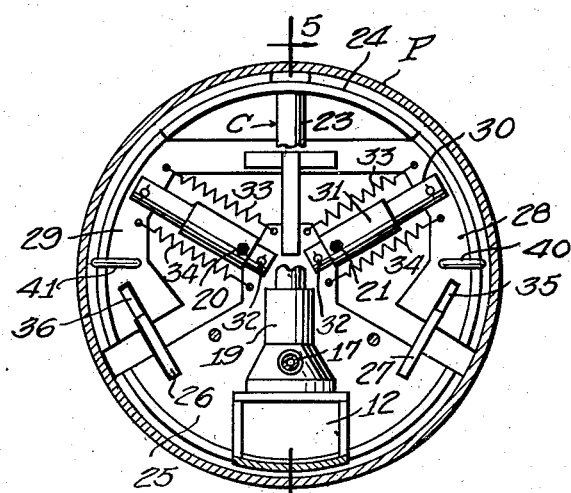
FIG.-4-
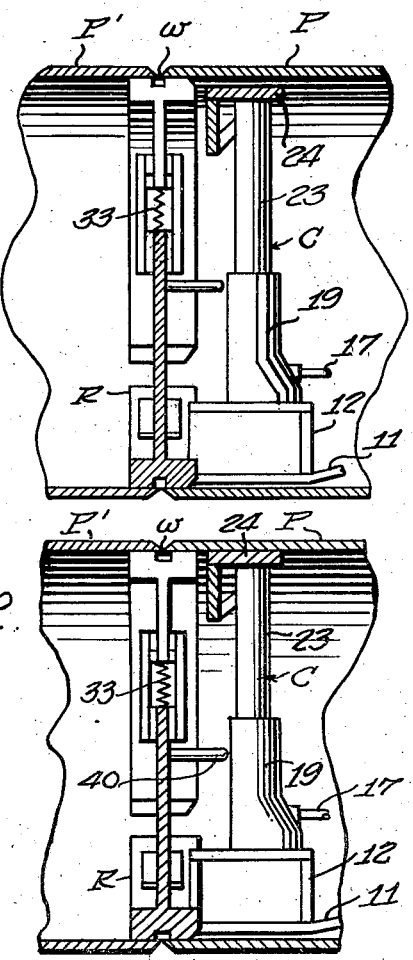
FIG.-5-
FIG.-6-
INVENTORS
B.V. ELLIOTT
BY H.C. PRICE
Ben Cohen
ATTORNEY Patented Sept. 24, 1946

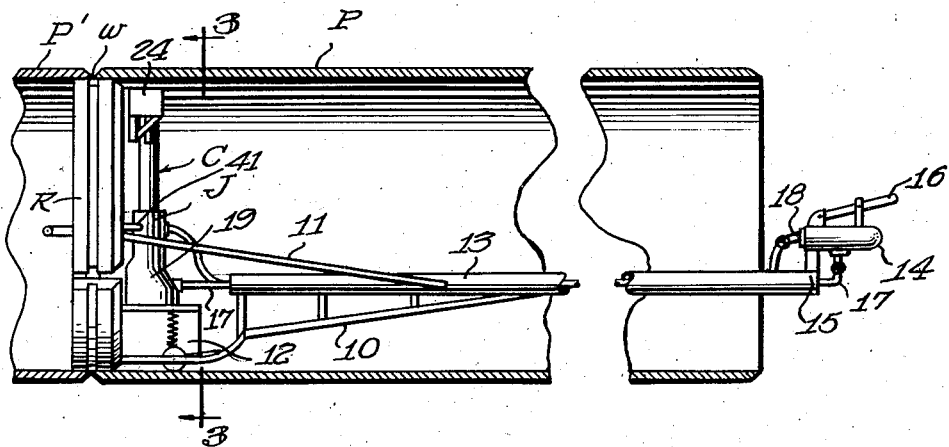
FIG.-1-
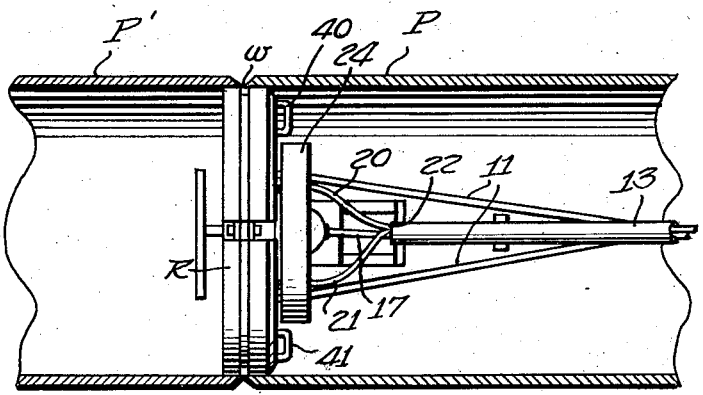
FIG.-2-

2,408,255

UNITED STATES PATENT OFFICE 2,408,255

HYDRAULIC INTERNAL LINE-UP CLAMP

Bernard V. Elliott and Harold C. Price, Bartlesville, Okla., assignors to H. C. Price Company, Bartlesville, Okla.

Application September 13, 1944, Serial No. 553,948

5 Claims. (Cl. 113—103)

The instant invention relates to an internal line-up clamp for lining up pipe sections prior to welding and more particularly to such a clamp having hydraulic operating means therefor.

One of the primary objects of the invention is the construction of a line-up clamp of the character specified having an hydraulically operated split clamping ring and a similarly actuated jack associated therewith, the jack serving to support the ring for the clamping operation.

Still another aim is the fabrication of a device of the type indicated which may be made portable for ready insertion into a pipe section for ease of operation; which is efficient in use, assembled of few parts and well adapted for its intended function.

The above and other aims and objects will be apparent from the detailed description hereinafter appearing when taken in conjunction with appended drawings forming a part hereof, to which attention is now directed and in which Fig. 1 is a side elevational view of the novel line-up clamp operatively positioned within a pair of abutting pipe sections about to be welded together, with the pipe sections in longitudinal section and partly broken away;

Fig. 2 is a partial plan view of the structure of Fig. 1;

Fig. 3 is a sectional view taken on line 3—3 of Fig. 1;

Fig. 4 is a view similar to Fig. 3 but with the clamping plate sections in expanded position and the jack head in retracted position;

Fig. 5 is a sectional view taken on line 5—5 of Fig. 4; and

Fig. 6 is a sectional view similar to Fig. 5 but showing the jack and plate sections expanded.

Referring first to Figs. 1 and 2, the reference characters P and P' designate a pair of abutting pipe sections adapted to be aligned and held in position by the novel internal clamp C forming the subject matter of the instant application, whereby a peripheral weld may be applied at w to unite said pipe sections. The clamp C comprises a supporting framework 10 which includes converging brace rods 11 and a base 12, the rods 11 supporting a longitudinally extending hollow pipe 13 of small diameter. An hydraulic pump 14 is secured to the outer end 15 of pipe 13 and supported thereby, said pump having an operating handle 16 and a pair of flexible hollow lines of copper tubing or the like 17 and 18 leading therefrom. The pump may be equipped in any conventional manner with a pair of valves so that the fluid therein may be selectively directed under pressure to one or the other of the flexible hollow lines 17 and 18. Line 17 leads to the base 19 of a jack J fixed to base support 12 of framework 10, while hollow line 18 branches out into two separate lines 20 and 21 as it emerges from pipe 13 as at 22, see Fig. 2. Jack J is provided with the conventional reciprocable piston 23 terminating in a head 24.

Secured to the base 12 of the framework 10 is a split clamping ring R which includes an immovable supporting disc 25 having a pair of stationary guides 26 and 27 secured thereto. Ring R further comprises a pair of similar movable plate members 28 and 29, each plate member including a piston 30 secured thereto, said piston being reciprocable in a cylinder 31 fastened to stationary support 25 as at 32. Movement of piston 30 relative to cylinder 31 is brought about upon actuation by the fluid medium pumped under pressure to each cylinder through lines 20 or 21. Such action moves plate members 28 and 29 outwardly against the tension of a pair of parallel spring elements 33 and 34 secured to the support 25 and a plate member 28 or 29, the connection being at the opposed ends of a spring element. The stationary guides 26 or 27 fit in a slot 35 or 36 in a plate member to maintain an alignment of the plates and their base 25 at all times.

In the use of the clamp C it is grasped by a pair of handles 40 and 41 and positioned within pipe section P as indicated in Fig. 1 of the drawings, so that the jack J is within the pipe section P while split ring R has a portion projecting slightly therebeyond. The jack is now hydraulically actuated by pump 14 so that the head 25 of the jack abuts internally of the pipe section P. This maintains the ring R in proper position to permit the main pipe section P' to be brought into abutting end to end relationship with pipe section P, whereupon the ring R is expanded by actuation of pump 14 to expand clamp plates 28 and 29 against tension of spring elements 33 and 34 into contact with the inner marginal surfaces of the pipe sections, to hold the pipe sections aligned, whereupon the welding operation is performed at w. Upon release of fluid pressure the plates are returned from the position of Fig. 4 to that of Fig. 3 and the head 25 of jack J recedes when pressure is released from the position shown in Fig. 6 to that of Fig. 5.

From the above it will be apparent that there has been produced an internal hydraulic line-up clamp well fitted to quickly and efficiently align pipe sections or the like in preparation for a peripheral welding operation.

What we claim and desire to secure by Letters Patent is:

1. An internal line-up clamp comprising a support, a jack and a clamping ring carried by said support, said jack having an element thereof adapted to contact an inner surface of a pipe upon actuation of said jack, said jack being mounted inwardly of and adjacent said clamping ring, said ring comprising a stationary disc and a pair of movable plates carried by said disc, said disc having a pair of spaced cylinders secured thereto, a piston in each cylinder connected to a plate, and means for selectively actuating the jack and pistons.

2. In an internal line-up clamp having a support, a jack and a clamping ring carried by the support, said jack being mounted inwardly of and adjacent the clamping ring, said clamping ring comprising a stationary disc and a pair of movable plates carried by the disc, said plates having hydraulically actuated cylinders and pistons for moving same and means for actuating the jack.

3. In an internal line-up clamp, a clamping ring comprising a stationary support and plates carried by the support, means for moving each plate relative to such support, said means comprising a cylinder secured to the support and a piston movable in the cylinder and attached to a plate, spring means connected to each plate and the support to resist movement of the plate outwardly from the support, and an hydraulic pump connected to the cylinders for actuating said pistons.

4. An internal line-up clamp for use in welding the adjacent edges of a pair of pipe or tubular sections, comprising a supporting base, a clamping segmental ring carried by said base, said clamping ring having movable clamping segments, means to support said segments for movement into contact with the inner marginal surfaces of the pipes, a jack mounted on said supporting base adjacent the clamping ring, means for moving an element of said jack into engagement with the inner wall of the pipe to secure the supporting member in such position that the clamping ring is properly positioned to engage the inner marginal surfaces of adjacent pipes, and means to move the clamping segments into engagement with said marginal surfaces.

5. An internal line-up clamp for use in welding the adjacent edges of a pair of pipe or tubular sections, comprising a supporting base, a clamping segmental ring carried by said base, said clamping ring having movable clamping segments, means to support said segments for movement into contact with the inner marginal surfaces of the pipes, a jack mounted on said supporting base adjacent the clamping ring, means for moving an element of said jack into engagement with the inner wall of the pipe to secure the supporting member in such position that the clamping ring is properly positioned to engage the inner marginal surfaces of adjacent pipes, means to move the clamping segments into engagement with said marginal surfaces, and means to retract the clamping segments.

BERNARD V. ELLIOTT.
HAROLD C. PRICE.